(12) United States Patent
Ozbek et al.

(10) Patent No.: US 10,641,916 B2
(45) Date of Patent: May 5, 2020

(54) PROCESSING SEISMIC DATA BY NONLINEAR STACKING

(71) Applicant: Schlumberger Technology Corporation, Sugar Land, TX (US)

(72) Inventors: Ali Ozbek, Milton (GB); Julian Drew, Houston, TX (US); Anthony Probert, Cambridge (GB); Daniel Gordon Raymer, Manly (AU)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 852 days.

(21) Appl. No.: 14/397,196

(22) PCT Filed: Jun. 21, 2013

(86) PCT No.: PCT/IB2013/055104
§ 371 (c)(1),
(2) Date: Oct. 26, 2014

(87) PCT Pub. No.: WO2013/190513
PCT Pub. Date: Dec. 27, 2013

(65) Prior Publication Data
US 2015/0112601 A1  Apr. 23, 2015

Related U.S. Application Data

(60) Provisional application No. 61/663,416, filed on Jun. 22, 2012, provisional application No. 61/663,449, (Continued)

(51) Int. Cl.
*G01V 1/30* (2006.01)
*G01V 1/00* (2006.01)
(Continued)

(52) U.S. Cl.
CPC .............. *G01V 1/30* (2013.01); *G01V 1/003* (2013.01); *G01V 1/288* (2013.01); *G01V 1/366* (2013.01);
(Continued)

(58) Field of Classification Search
CPC .......... G01V 1/30; G01V 1/003; G01V 1/288; G01V 1/366; G01V 1/362; G01V 2210/32;
(Continued)

(56) References Cited

U.S. PATENT DOCUMENTS

| 4,740,928 A | 4/1988 | Gutowski et al. |
| 5,073,875 A | 12/1991 | Kelly et al. |

(Continued)

FOREIGN PATENT DOCUMENTS

| EP | 0335450 | 10/1989 |
| WO | 2001/84462 | 11/2001 |

(Continued)

OTHER PUBLICATIONS

International Search Report for corresponding PCT Application Serial No. PCT/IB2013/055103 dated Feb. 19, 2014, 10 pages.
(Continued)

*Primary Examiner* — Michael P Nghiem
*Assistant Examiner* — Dacthang P Ngo

(57) ABSTRACT

Seismic data processing using one or more non-linear stacking enabling detection of weak signals relative to noise levels. The non-linear stacking includes a double phase, a double phase-weighted, a real phasor, a squared real phasor, a phase and an N-th root stack. Microseismic signals as recorded by one or more seismic detectors and transformed by transforming the signal to enhance detection of arrivals. The transforms enable the generation of an image, or map, representative of the likelihood that there was a source of
(Continued)

seismic energy occurring at a given point in time at a particular point in space, which may be used, for example, in monitoring operations such as hydraulic fracturing, fluid production, water flooding, steam flooding, gas flooding, and formation compaction.

15 Claims, 11 Drawing Sheets

Related U.S. Application Data filed on Jun. 22, 2012, provisional application No. 61/663,403, filed on Jun. 22, 2012.

(51) Int. Cl.
    *G01V 1/28*     (2006.01)
    *G01V 1/36*     (2006.01)

(52) U.S. Cl.
    CPC .......... *G01V 1/362* (2013.01); *G01V 2210/32* (2013.01); *G01V 2210/322* (2013.01); *G01V 2210/60* (2013.01); *G01V 2210/63* (2013.01); *G01V 2210/74* (2013.01)

(58) Field of Classification Search
    CPC ......... G01V 2210/322; G01V 2210/60; G01V 2210/63; G01V 2210/74
    USPC .......................................................... 702/14
    See application file for complete search history.

(56) References Cited

U.S. PATENT DOCUMENTS

| | | | |
|---|---|---|---|
| 5,197,039 | A | 3/1993 | Corcoran et al. |
| 6,061,298 | A | 5/2000 | Madison et al. |
| 6,519,533 | B1 | 2/2003 | Jeffryes |
| 6,748,330 | B2 | 6/2004 | Leaney |
| 7,391,675 | B2 | 6/2008 | Drew |
| 7,525,873 | B1 | 4/2009 | Bush et al. |
| 7,978,563 | B2 | 7/2011 | Thornton et al. |
| 2003/0031091 | A1 | 2/2003 | Kim |
| 2003/0048696 | A1 | 3/2003 | Duren |
| 2005/0225323 | A1 | 10/2005 | Cunningham et al. |
| 2006/0062084 | A1 | 3/2006 | Drew |
| 2006/0253019 | A1 | 11/2006 | Lee |
| 2008/0173104 | A1 | 7/2008 | German |
| 2009/0310441 | A1 | 12/2009 | Johnson et al. |
| 2009/0316527 | A1 | 12/2009 | Stewart et al. |
| 2010/0016708 | A1 | 1/2010 | Katscher et al. |
| 2011/0044131 | A1 | 2/2011 | Thornton et al. |
| 2011/0071763 | A1 | 3/2011 | Klein et al. |
| 2011/0305109 | A1 | 12/2011 | Soubaras |
| 2012/0134234 | A1 | 5/2012 | Roberts et al. |

FOREIGN PATENT DOCUMENTS

| | | |
|---|---|---|
| WO | 2011/144623 | 11/2011 |
| WO | 2013/190512 | 12/2013 |
| WO | 2013/190513 | 12/2013 |

OTHER PUBLICATIONS

International Search Report for corresponding PCT Application Serial No. PCT/IB2013/055104 dated Feb. 19, 2014, 13 pages.
J. Drew et al, "Automated Microseismic Event Detection and Location by Continuous Spatial Mapping," SPE 95513, Oct. 2005, 7 pages.
H. Kao et al, "The Source-Scanning Algorithm: Mapping the Distribution of Seismic Sources in Time and Space," Geophys. J. Int. (2004) pp. 589-594.
F.W. King, "Hilbert Transforms: vol. 1 (Encyclopedia of Mathematics and its Applications)", Cambridge University Press, 2009.
K.J. Muirhead, "Eliminating false alarms when detecting seismic events automatically," 1968, Nature, 217, pp. 533-534.
E.R. Kanasewich, C.D. Hemmings, T. Alpaslan, "Nth-Root Stack Nonlinear Multichannel Filter," Geophysics, Apr. 1973, vol. 38, Issue 2. pp. 327-338.
M. Schimmel, H. Paulssen, "Noise reduction and detection of weak, coherent signals through phase-weighted stacks," Geophysical Journal International 1997, vol. 130, Issue 2, pp. 497-505.
H. Ekre, "Polarity Coincidence Correlation Detection of a Weak Noise Source," Information Theory, IEEE Transactions on 1963, vol. 9, Issue 1, pp. 18-23.
A. Ratcliffe, F. Adler, "Accurate velocity analysis for Class II AvO events," 70th SEG meeting, Calgary, Canada, 2000, Expanded Abstracts, pp. 232-235.
D. Sarkar, R.T. Baumel, K.L. Larner, "Velocity analysis in the presence of amplitude variation," 2002, Geophysics, vol. 67, Issue 5, pp. 1664-1672.
S. Fomel, "Velocity analysis using AB semblance," Geophysical Prospecting, vol. 57, Issue 3, pp. 311-321, 2009.
H. Bungum, E.S. Husebye, F. Ringdal, "The NORSAR Array and Preliminary Results of Data Analysis," Geophys, J.R. Astr. Soc., 25, 1971, pp. 115-126.
J. Wong, L. Han, J. Bancroft, R. Stewart, "Automatic time-picking of first arrivals on noisy microseismic data," Canadian Society of Exploration Geophysicists, 2009.
Office Action issued in EP application 13807168.3 dated Jun. 12, 2015, 7 pages.
Search Report issued in EP application 13807168.3 dated May 18, 2015, 5 pages.
McFadden, et al., "The Nth-Root Stack: Theory, Applications, and Examples", Oct. 1, 1986, Geophysics vol. 51, No. 10, pp. 1879-1892.
Wright, et al., "The P-wavespeed structure in the lowermost 700km of the mantle below the central part of the Indian Ocean", May 1, 2007, Physics of the Earth and Planetary Interiors, Elsevier, Amsterdam, NL, vol. 161, No. 3-4, pp. 243-266.
Rost, "Array seismology: Methods and applications", Dec. 5, 2002, Reviews of Geophysics, vol. 40, No. 3, 27 pages.
Zhang, et al., "Source characteristics of the deep Philippine earthquake cluster, Jul. 23 and 24, 2010", Jan. 17, 2012, Journal of Seismology, Kluwer Academic Publishers, DO, vol. 16, No. 2, pp. 275-289.
European Search Report issued in application 13807168.3 dated May 27, 2015, 4 pages.
European Examination Report for corresponding European Application Serial. No. 13807168.3, dated Apr. 5, 2017, 9 pages.

| | DETECTION PERCENTAGE (MAX WITHIN ± 30 MS) | AVERAGE STA/LTA PEAK/SIDELOBE (dB) |
|---|---|---|
| LINEAR STACK | 38.9 | -0.1 |
| N-th ROOT STACK (n=4) | 94.5 | 14.7 |
| PHASE-WEIGHTED STACK, m=2 | 88.9 | 9.7 |
| PHASE-WEIGHTED N-th ROOT STACK (m=2, n=4) | 94.5 | 15.7 |

PROCESSING SEISMIC DATA BY NONLINEAR STACKING

CROSS RELATED APPLICATIONS

This application claims the benefit of the following U.S. Provisional Applications:
Application Ser. No. 61/663,403 filed on 22 Jun. 2012, titled "Seismic Data Processing Using a Phase Weighted Nth Root Stack";
Application Ser. No. 61/663,416 filed on 22 Jun. 2012, titled "Detecting and Correcting Changes in Signal Polarity for Seismic Data Processing"; and
Application Ser. No. 61/663,449 filed on 22 Jun. 2012, titled "Seismic Data Processing by Nonlinear Stacking Methods";
the disclosures of which are incorporated by reference herein in their entirety for all purposes.

BACKGROUND

Reservoir characterization may be accomplished in a variety of ways for modeling behavior of fluids within a reservoir under different sets of circumstances and for finding optimal production techniques to maximize production. Seismic and microseismic surveys may be used for many applications, including for characterizing structure, lithology, fractures, and fluid distribution in a reservoir. One example of an application for seismic or microseismic surveying for fluid monitoring is in hydraulic fracturing operations, wherein microseismic monitoring can be used to track the propagation of a hydraulic fracture as it advances through a formation. Seismic events can be detected, located and used to detect propagation of fluids (or fractures). Software may provide modeling, survey design, microseismic events detection and location (which may be optionally automated), uncertainty analysis, data integration, and visualization for interpretation.

Seismic events are acoustic events generated by force, such as by airguns, vibroseis, dynamite, etc. Microseismic events are elastic events generated by rock movement. Microseismic events may be generated during hydraulic fracturing as well as during other operations, such as fluid production, water, gas or steam flooding, or formation compaction. In seismic surveys, a seismic source may induce seismic waves in the earth. In a microseismic survey, the sources of the seismicity/seismic waves or the like may be natural or induced fractures in the earth. In both cases, the seismic waves may propagate through the earth, be transmitted, reflected, and diffracted by formations or discontinuities, and can be detected by a plurality of sensors, at the surface or within the earth. Each of the sensor monitors the seismic wavefield, which is then recorded. The data received by a sensor, and then recorded, is collectively referred to as a trace. The collection of traces may be processed to gain information about the earth's subsurface, or stored for later processing.

Seismic and microseismic events, both naturally occurring and induced, can be characterized by a moment tensor that describes a unique radiation pattern, having a polarity component and an amplitude component, of the compressional and shear seismic energy radiated from the source of the seismic event. A large-aperture seismic array may be useful to observe changes in polarity and amplitude of the radiated energy. Inversion of seismic moment tensors can provide a way to characterize microseismic events to gain an understanding of stresses and strains in an earth structure, including the orientation and propagation of fractures in the earth structure.

Non-linear event location methods may involve selection and time picking of discreet microseismic arrivals for each of a plurality of seismic detectors and mapping the data collected in this way to visually locate the source of microseismic energy. However, to successfully and accurately locate the microseismic event, the discrete time picks for each seismic detector need to correspond to the same arrival of either a "P" or "S" wave, and the discrete time picks for each seismic detector must measure/be associated with an arrival originating from a unique microseismic event.

Imaging approaches to detection and location of seismic events may involve summing the signals recorded by a seismic array. However, when there are changes in the polarity of the moment tensor, signals having opposing polarity cancel each other out during stacking computations, rather than sum constructively.

In the hydrocarbon industry, feedback on seismic events occurring in the formation can be used to plan various stages of wellsite operations. Feedback in real-time enables operators to intervene, direct or redirect the operations during the process to optimized production results obtained from the process.

Some feedback methods involve processing microseismic event locations by mapping microseismic arrival times and polarization information into three-dimensional space through the use of modeled travel times and/or ray paths. Travel time look-up tables may be generated by modeling for a given velocity model. One mapping method is commonly known as the "Non-Linear Event Location" method. Non-linear event location has also been used to locate macro seismic events such as earthquakes. Additional information on the topic can be found in U.S. Pat. No. 7,391,675 to Drew, incorporated herein in its entirety, and the references listed therein.

SUMMARY

This summary is provided to introduce a selection of concepts that are further described below in the detailed description. This summary is not intended to identify key or essential features of the claimed subject matter, nor is this summary intended to be used as an aid in limiting the scope of the claimed subject matter.

In an embodiment of the present invention, a method is disclosed for seismic data processing by a nonlinear stacking method. The method can include receiving a seismic data signal acquired from a formation, computing a phase-weighted stack of the seismic data signal, computing an $n^{th}$ root stack of the seismic data signal, and calculating a phase-weighted $n^{th}$ root stack as a product of the phase-weighted stack of the seismic data signal and the $n^{th}$ root stack of the seismic data signal. The method may also include outputting the phase-weighted $n^{th}$ root stack. In one embodiment, the phase-weighted stack of the seismic data signal may be a linear summation of the seismic data signal weighted by an instantaneous phase of the seismic data signal. In another embodiment, the $n^{th}$ root stack of the seismic data signal may be a nonlinear summation of the seismic data signal weighted by an $n^{th}$ root of the seismic data signal.

In another embodiment, a system is disclosed for acquiring and processing the seismic data. The system can include a seismic acquisition apparatus disposed at a formation that acquires the seismic data and a data processing apparatus.

The data processing apparatus can receive a seismic data signal(s) acquired in the formation, compute a phase-weighted stack of the seismic data signal, compute an $n^{th}$ root stack of the seismic data signal, calculate a phase-weighted $n^{th}$ root stack as a product of the phase-weighted stack of the seismic data signal and the $n^{th}$ root stack of the seismic data signal, and output the phase-weighted $n^{th}$ root stack.

BRIEF DESCRIPTION OF THE DRAWINGS

Embodiments of a method and system for seismic data processing by a phase-weighted $n^{th}$ Root Stack are described with reference to the following figures. Like numbers are used throughout the figures to reference like features and components.

DETAILED DESCRIPTION

Figure 1:
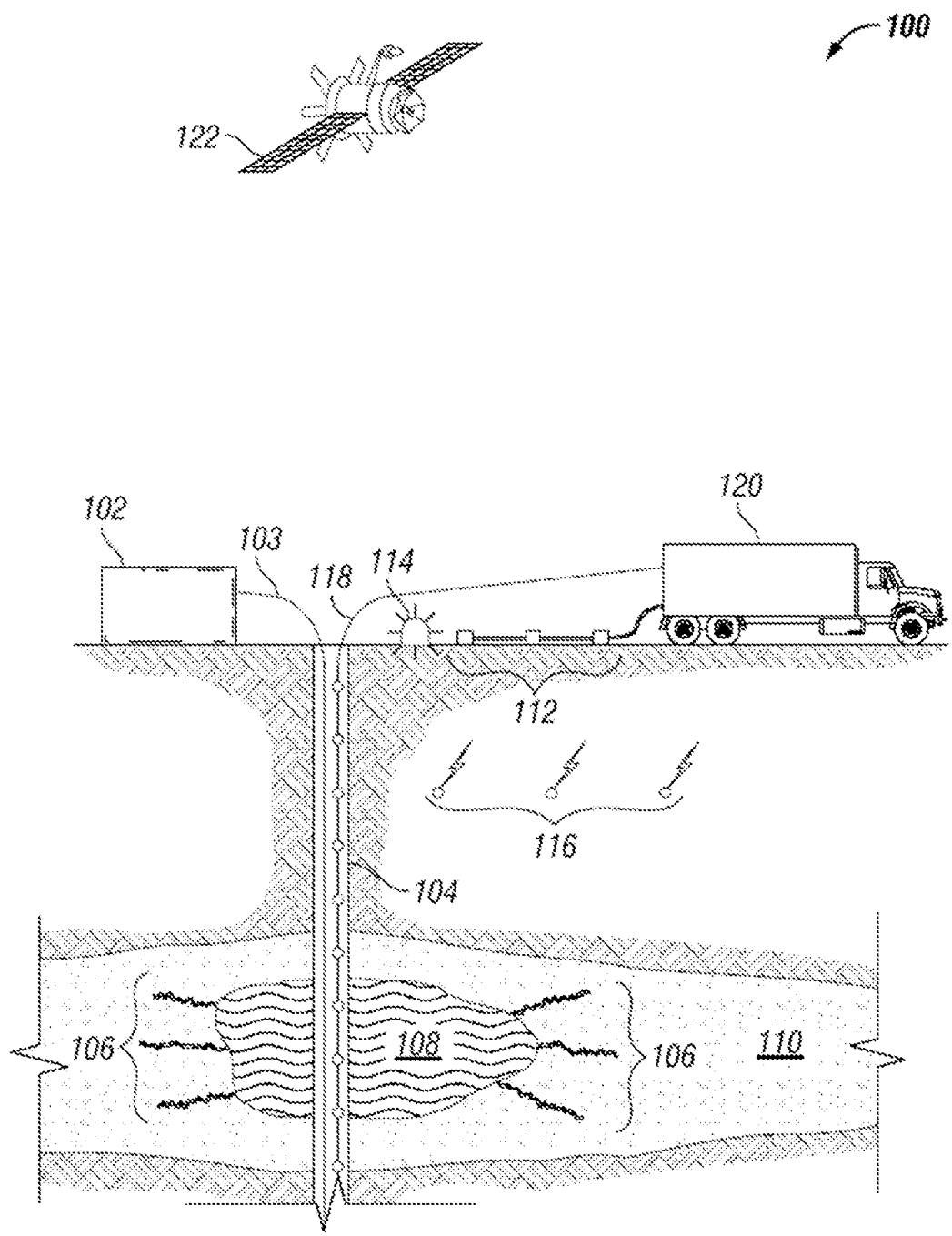
FIG. 1 illustrates a wellsite system, in accordance with one or more implementations of various techniques described herein.

In the following description, numerous details are set forth to provide an understanding of the present disclosure. However, it will be understood by those skilled in the art that the present disclosure may be practiced without these details and that numerous variations or modifications from the described embodiments are possible.

Specific details are given in the following description to provide a thorough understanding of the embodiments. However, it will be understood by one of ordinary skill in the art that the embodiments maybe practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The disclosure relates to methods for data processing seismic survey data, including microseismic data. In an embodiment, the present disclosure is directed to new methods for computing a nonlinear stack, for example a phase-weighted $n^{th}$ root stack, for increasing the signal-to-noise ratio (SNR) of the data, and thus enabling the detection of signals that are weak relative to noise levels. The methods and systems provided herein facilitate transforming seismic or microseismic signals as recorded by one or more seismic detectors to improve the SNR, and thereby enhance detection of arrivals. The methods serve to attenuate noise in seismic data. In at least one embodiment, the nonlinear stack processing method may render the resulting stack impervious to polarity reversals: in fact, if processed in the absence of at least one of the methods disclosed here, contributing signals obtained by an array, when summed, may destructively interfere if one or more signals have opposite polarity, resulting in less accurate detection and location of seismic events. As such, embodiments of the present invention provide for transforming recorded seismic data into detectable data that may be processed to identify/image properties of a subterranean section of the earth.

FIG. 1 illustrates a wellsite system 100 in accordance with one or more implementations of various techniques described herein. The wellbore operation may be also referred to herein as the "hydraulic fracturing operation," though various additional/other production operations are contemplated herein as well. In the wellsite system 100, the operation may be conducted in concert with an active seismic survey in order to improve the effectiveness of the operation. The wellsite system 100 may optionally include an operations mechanism 102 for applying an operation such as pumping a fluid (such as a fracturing fluid or proppant) into or applying pressure or seismic forces to a well bore 104 disposed in a hydrocarbon reservoir 108. The wellsite system 100 may also include a surface seismic array 112, a buried seismic array 116, a borehole seismic array 118, or any combination thereof. A seismic source 114 may be included in the system 100.

The hydrocarbon reservoir 108 may be disposed within a subsurface formation 110, such as, merely by way of example, one of sandstone, carbonate, or chalk. Fractures 106 may be present in the formation 110, the fractures may be naturally occurring and/or caused by/altered by, for example, the operation. The fractures 106 may provide flow conduits/improve the flow of hydrocarbons to the wellbore 104.

Receivers (i.e., geophones) (not shown) that may make up the seismic arrays 112, 116 and/or 118 or be used separately from the array may be used to collect seismic, or, more particularly, microseismic data. The receivers may be deployed in a number of ways: inserted near the depth of investigation (i.e., at the depth of a fracture) in a borehole (either the well being monitored or a nearby well); placed on the surface; buried shallowly (for example, at 1 to 300 feet, as opposed to formation depths); and any combination thereof.

The surface seismic array 112, the buried seismic array 116, and the borehole seismic array 118 may include standard seismic receiver arrays used in seismic surveying, and may include geophones, receivers, or other seismic sensing equipment configured to acquire seismic or microseismic data. The surface seismic array 112 may be positioned on the surface as a network of sensors. The buried seismic array 116 may be buried at any depth. In an embodiment, the buried seismic array 116 may be buried at a depth that is shallow relative to the depth of the formation 110, such as, but not limited to, a range from 1 to 300 feet or the like. The borehole seismic array 118 may be disposed permanently in the borehole, for example, or conveyed to any depth via a wireline cable, coiled tubing or the like.

The seismic source 114 may be a standard seismic source used in seismic surveying, such as a vibroseis or dynamite. The seismic source 114 may be located on the surface, in a borehole and/or the like. The seismic source 114, the surface seismic array 112, the buried seismic array 116 and/or the borehole seismic array 118 may be used to perform a seismic survey during the operation.

The wellsite system 100 may also include a data processing apparatus 120 in a truck (or other convenient location, for instance, such as a vehicle, shelter or building) with computer equipment, discussed further below, to receive data acquired during a seismic survey by the surface seismic array 112, the buried seismic array 116, the borehole seismic array 118, or any combination thereof according to a survey geometry. A data connection may be present between the surface seismic array 112, the buried seismic array 116, the borehole seismic array 118 and the data processing apparatus 120, and the data connection may be a wired connection or a wireless connection.

Alternatively, for data processing at a data processing location remote to the wellsite, a satellite 122 may be included, providing a wireless data connection between the surface seismic array 112, the buried seismic array 116, and the borehole seismic array 118 (or any combination thereof) to computer equipment, discussed further below, located at the data processing location. The manner of telemetry between the various system components is intended to be inclusive of all wired and wireless communications known and developed in the future; it is not the focus of the present disclosure. In some aspects, a wired network (not shown) and/or a wireless network may be used to carry data between parts of the illustrated system.

In an embodiment, the data from the surface seismic array 112, the buried seismic array 116, and/or the borehole seismic array 118 may be pre-processed (for example, by the data processing apparatus 120) before the methods described in this patent are applied to the data. The pre-processing might include any one or more of the following steps in any order: filtering, transforming, interpolating, combinations of 3-component signals (for instance XYZ sensors), and modifying the time-index; the steps can be applied to either single or several traces together, either deterministic or data-dependent. The specific individual processes may include, but are not limited to: frequency filtering, time resampling, deconvolution, signal rotation or re-orientation, noise-attenuation, FK filtering, tau-p filtering, time-variant moveout corrections, static-time corrections, modeled-time corrections, interpolation of traces, interpolation of sample values, and the like. Thus the data as processed according to the methods described herein may be pre-processed upon receipt from the surface seismic array 112, the buried seismic array 116, and the borehole seismic array 118.

In one implementation, a seismic survey may be used to improve the effectiveness of a fracturing operation. For example, by performing a seismic survey during the fracturing operation, it may be possible to identify where in the formation 110 the fractures 106 are induced. In other implementations, seismic surveys may be used to improve the effectiveness of a fluid production operation, to improve the effectiveness of a water, gas or steam flooding operation, and to improve the effectiveness of a formation compaction operation. Additional production operations that are well known in the field are also contemplated by the present disclosure.

Various non-linear stacking methods are have been developed for processing seismic data acquired via seismic data acquisition systems such as that described above with respect to FIG. 1. For example, in a non-linear stacking method referred to as the $n^{th}$ root stack, a product may be calculated by an equation according to the form:

$$y_{NR}(t,n)=\text{sgn}[u(t,n)]|u(t,n)|^n \quad \text{eq. 1}$$

where sgn[u(t, n)] is the sign or signum function (preserving the sign of u(t, n) when the $n^{th}$ power is applied), and the summation or $n^{th}$ root stack (see, e.g., Kanasewich et al., 1973) may be calculated by an equation according to the following form:

$$u(t,n) = \frac{1}{L}\sum_{i=1}^{L} \text{sgn}[x_i(t)]|x_i(t)|^{1/n} \quad \text{eq. 2}$$

wherein subscript i denotes the different receiver signals in the data, sgn[$x_i$(t)] represents the sign or signum function (preserving the sign of $x_i$(t) when the $n^{th}$ power is applied), L is the number of traces used in the stack, and the power n is a number larger than or equal to 1 that amplifies relatively small amplitude signals. For example, calculating an $n^{th}$ root stack with n=1, results in a linear stack, and n>1 leads to a reduction in the signal variance.

Alternatively, a phase-weighted stack, see, e.g., Schimmel and Paulssen, 1997, uses the coherence of the input signals as a function of time to weight the result of a linear stack, and can be calculated by an equation according to the form:

$$y_{PW}(t,m) = [y_P(t)]^m \frac{1}{L}\sum_{i=1}^{L} x_i(t) \quad \text{eq. 3}$$

where, m is a user selected parameter, and $$y_P(t) = \frac{1}{L}\left|\sum_{i=1}^{L} \exp\{j\phi_{x,i}(t)\}\right| \quad \text{eq. 4}$$

is the phase stack derived from the phase of the analytical signal $$x_A(t)=x(t)+j\mathcal{H}\{x(t)\}=|x_A(t)|\exp\{j\phi_x(t)\}, \quad \text{eq. 5}$$

wherein $\mathcal{H}\{x(t)\}$ is defined as a Hilbert transform of the signal x(t), and j is the unit imaginary number (defined by j*j=−1). A Hilbert transform is a well-established analytical transform described in detail in Frederick W. King, "HILBERT TRANSFORMS: VOLUME 1 (*Encyclopedia of Mathematics and its Applications*)", CAMBRIDGE UNIVERSITY PRESS, 2009.

From the non-linear stacking methods described above, timing and slowness information can be accurately extracted from seismic signals/data. These long-established methods, however, have but a single parameter by which to adjust the strength of filtering against noise. In various tests, in a manner in which to combine various stacking methods in a previously untested way that produced unexpectedly improved results over the $n^{th}$ root stack method or the phase-weighted stack method taken individually was discovered, as will be discussed further below. While each of the prior art methods has a single parameter by which to adjust the strength of filtering, the present methods each have at least two parameters, enabling the user to control the attenuation of the noise in the seismic data more judiciously, while preserving the underlying seismic signal.

Figure 2:
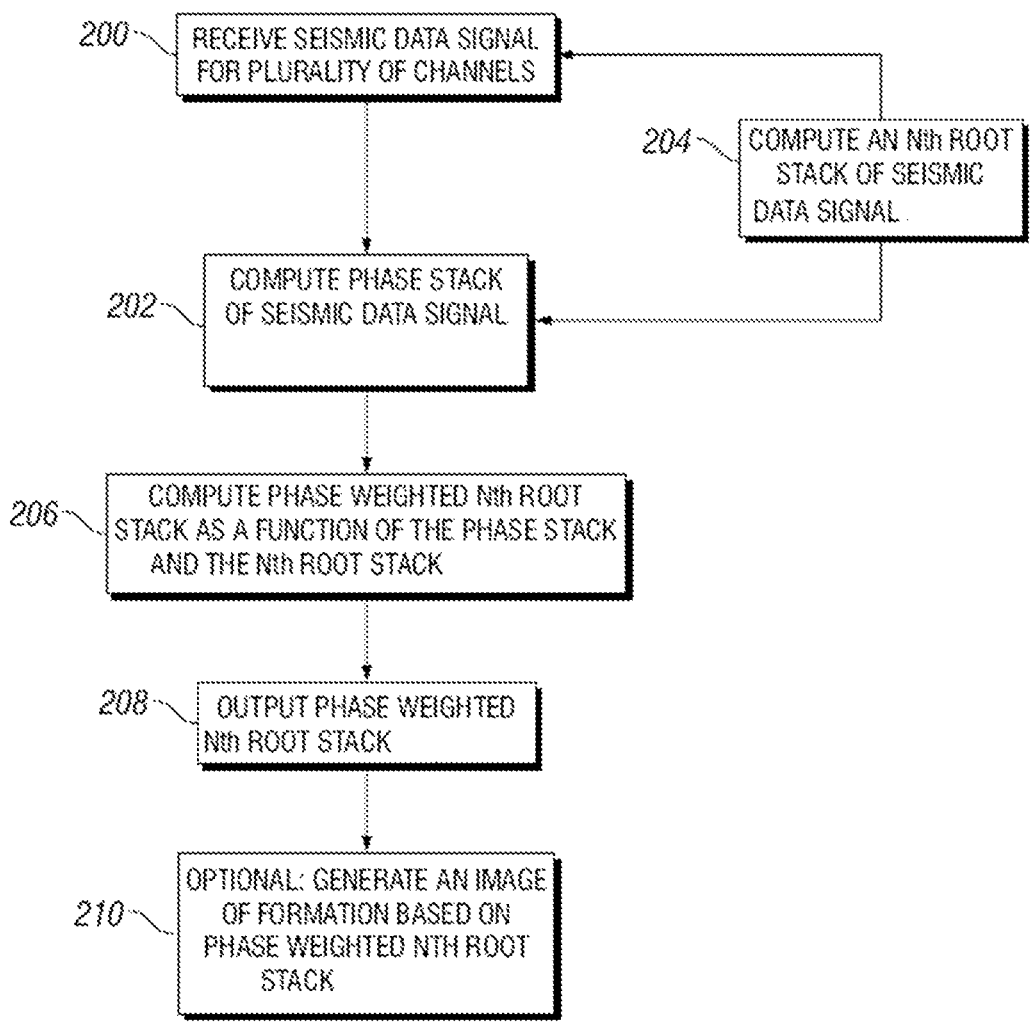
FIG. 2 shows a first seismic data processing method work flow, in accordance with one or more implementations of various techniques described herein.

Turning now to FIG. 2, a work flow is shown for a phase-weighted $n^{th}$ root stack seismic data processing method which, when applied, attenuates noise for improved SNR for improved detection of weak signals, in accordance with one or more implementations of various techniques described herein. The method begins with receiving a seismic data signal $x_i$(t) for a plurality of channels at 200. The method proceeds with computing a phase stack of the seismic data signal at 202, such as according to a form similar to eq. 4.

The method proceeds with computing an $n^{th}$ root stack of the seismic data signal at 204, such as according to a form similar to eq. 1. Eq. 2 represents the $n^{th}$ root stack; however, eq. 1 represents a compensated form of eq. 2 that may be used to account for the fact that the $n^{th}$ root has been taken for each of the input traces. As can be seen in FIG. 2, the computation at 202 and the computation at 204 may occur either in parallel or sequentially in any order.

The method proceeds with computing a phase-weighted $n^{th}$ root stack 206 as a function of the phase stack derived in 202 and the $n^{th}$ root stack derived in 204. The phase-weighted $n^{th}$ root stack may be derived according to an equation of the form:

$$y_{PWNR}(t,m,n)=[y_P(t)]^m y_{NR}(t,n) \quad \text{eq. 6}$$

where $y_P$(t) is the phase stack derived in 202, $y_{NR}$(t, n) is the $n^{th}$ root stack derived in 204, m is a user selected parameter; the resulting phase-weighted $n^{th}$ root stack $y_{PWNR}$(t) is a product of the two.

The method continues with outputting the phase-weighted $n^{th}$ root stack at 208 and optionally generating an image of the formation based on the phase-weighted $n^{th}$ root stack 210. Examples of such an image will be discussed further below, and an example type of image is shown in commonly assigned U.S. Pat. No. 7,391,675 to Drew, incorporated in its entirety by reference for all purposes. Using the seismic data processed according to the method of FIG. 2 for improved SNR as illustrated is merely one application among a myriad of known applications for processed seismic data.

Figure 3:
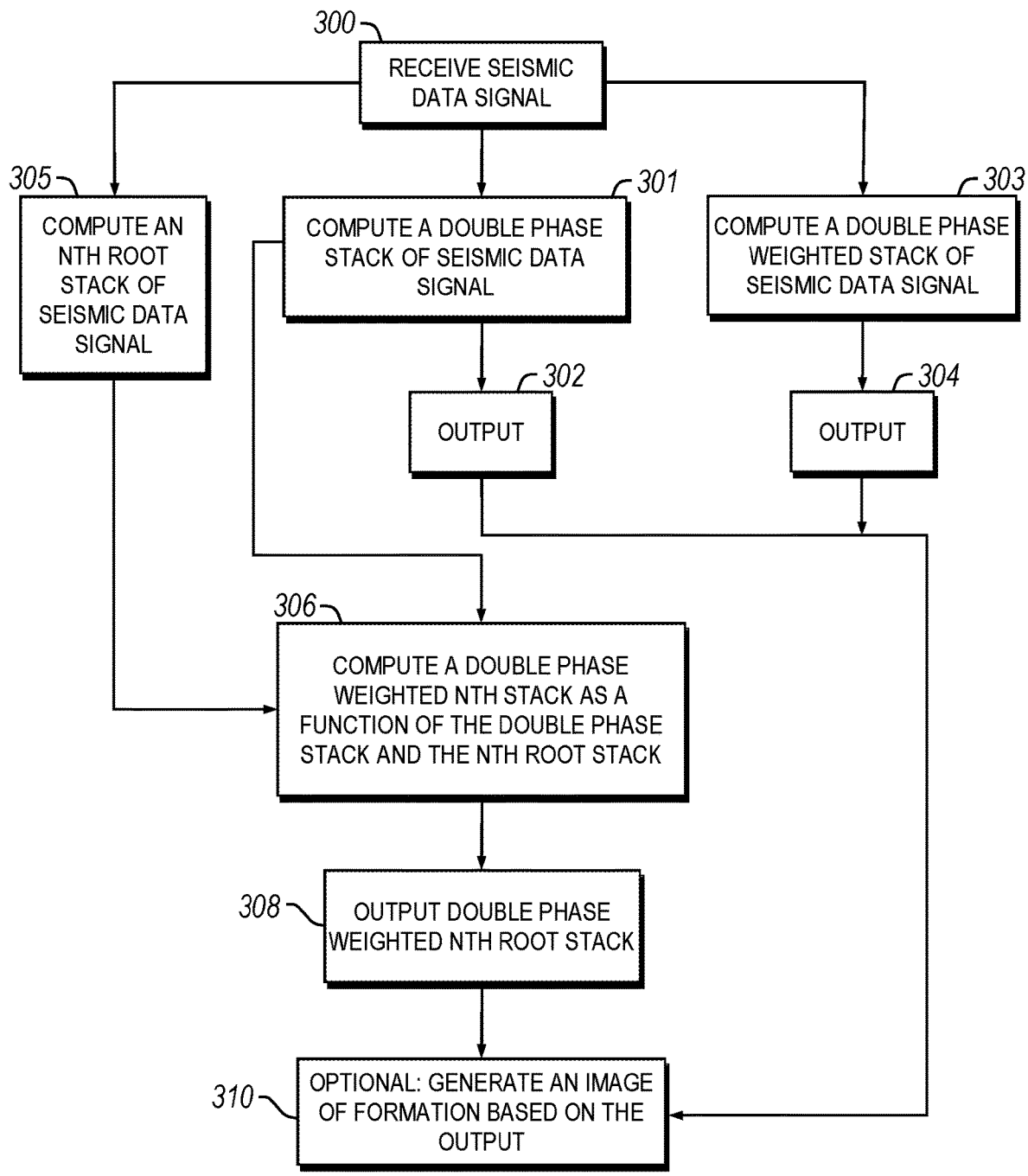
FIG. 3 shows a second seismic data processing method work flow, in accordance with one or more implementations of various techniques described herein.

Turning now to FIG. 3, a work flow is shown for a double phase-weighted $n^{th}$ root stack data processing method which, when applied, attenuates noise for improved SNR for improved detection of weak signals, in accordance with one or more implementations of various techniques described herein. Analogous to the phase-weighted stack described above at eq. 3, a double-phase-weighted stack may be governed by the form:

$$y_{DPW}(t,m) = [y_{DP}(t)]^m \frac{1}{L}\sum_{i=1}^{L} x_i(t) \quad \text{eq. 7}$$

where $$y_{DP}(t) = \frac{1}{L}\left|\sum_{i=1}^{L} \exp\{j2\phi_{x,i}(t)\}\right| \quad \text{eq. 8}$$

is the double-phase stack derived from the phase of the analytical signal of eq. 5.

In addition to improving detection of signals that are weak relative to noise levels, one application of the double phase weighting method (an embodiment of which is described with FIG. 3) is to render the resulting stack insensitive to any polarity changes in the signal.

Thus, the method of FIG. 3 begins with receiving a seismic data signal $x_i(t)$ for a plurality of channels at 300. The method proceeds with computing a double phase stack of the seismic data at 301 which are represented as $y_{DP}(t)$. The double phase stack may optionally be output at 302.

The method may optionally proceed in a parallel embodiment, with computing a double phase-weighted stack at 303, according to an equation of the form of eq. 7 as $y_{DPW}(t, m)$ for example, may be optionally output at 304.

The method may optionally proceed in still another parallel embodiment, with computing an $n^{th}$ root stack of the input seismic data signal at 305, such as according to a form similar to eq. 1, represented as $y_{NR}(t, n)$.

The method proceeds with computing a double phase-weighted $n^{th}$ root stack 306 as a function of the double phase stack derived in 301 and the $n^{th}$ root stack derived in 304. The double phase-weighted $n^{th}$ root stack may be governed by an equation of the form:

$$y_{DPWNR}(t,m,n)=[y_{DP}(t)]^m y_{NR}(t,n) \qquad \text{eq. 9}$$

where $y_{DP}(t)$ is the double phase stack derived in 301 and $y_{NR}(t, n)$ is the $n^{th}$ root stack derived in 305; the result represents a product of the two.

The method continues with outputting the double phase-weighted $n^{th}$ root stack $y_{DPWNR}(t, m, n)$ at 308, and, optionally, generating an image of the formation based on any of the various outputs shown in FIG. 3 (at 302, 304, or 308) at 310.

Numerical examples can illustrate the unexpected results for the methods of the present disclosure compared to other previously tested Nonlinear Methods.

Figure 4:
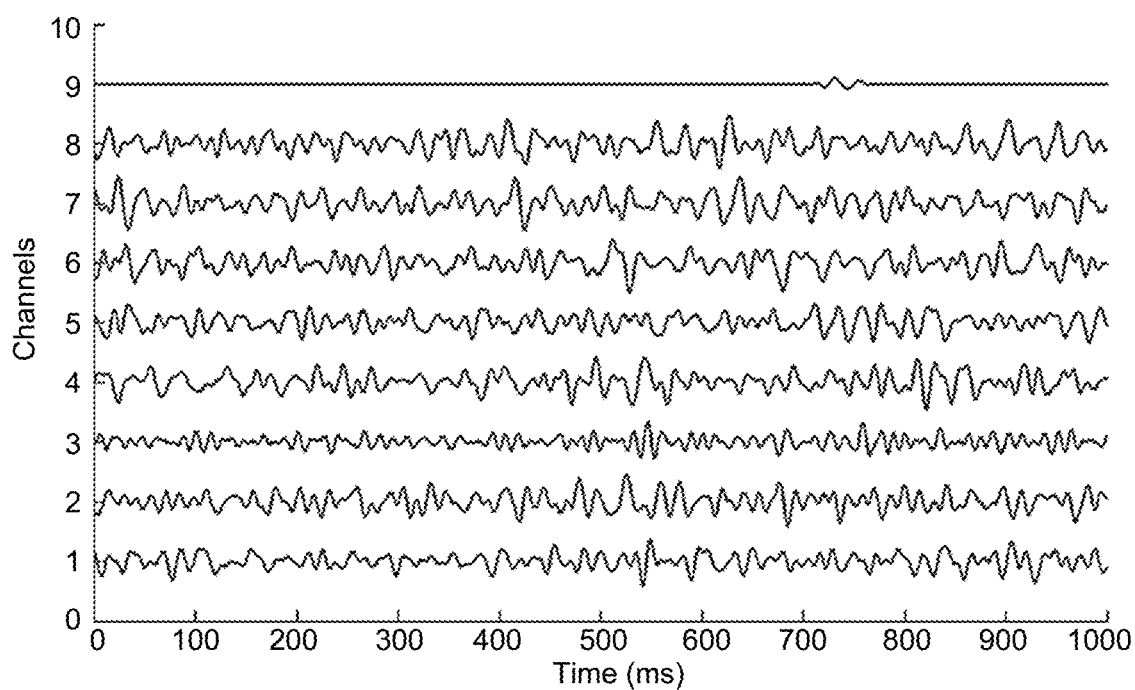
FIG. 4 shows a plot of an example of a synthetic signal added to a real noise signal, such as might be processed according to a method shown in FIG. 2, in accordance with an implementation of the present disclosure.
Figure 5:
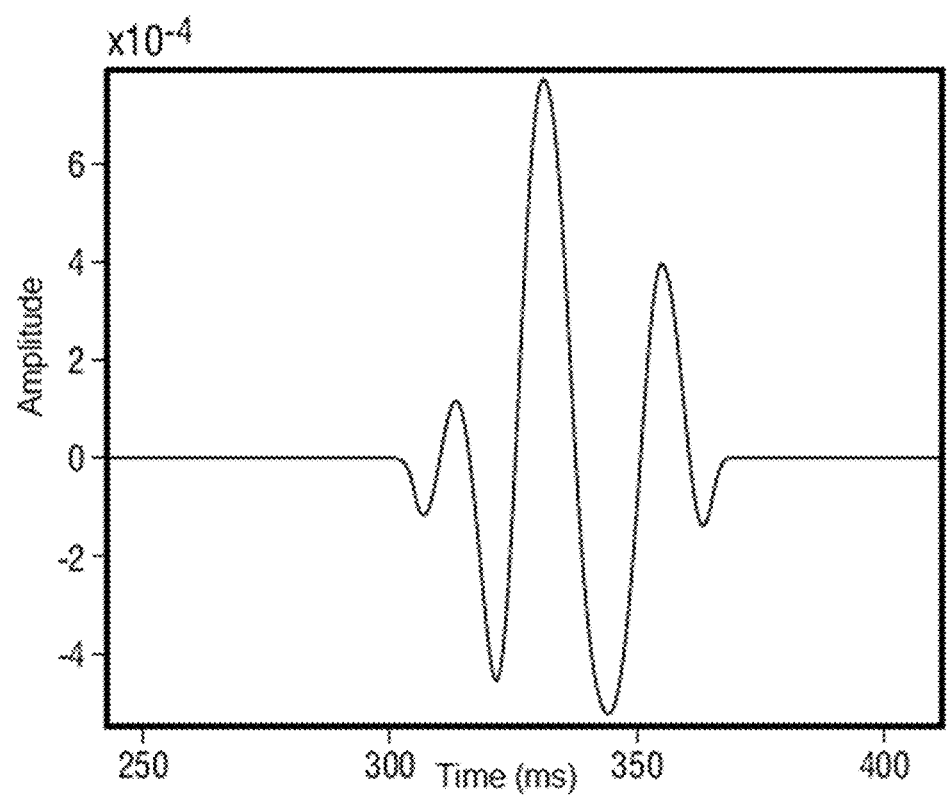
FIG. 5 shows a plot of an example signal signature of the synthetic signal of FIG. 4 without the noise signal, for purposes of comparing arrival times of various methods discussed with the actual arrival time.

FIG. 4 shows a dataset of eight data traces (traces 1-8) that are based on a synthetic signal (trace 9) added to a real noise sampled previously. The synthetic signal occurs at the same time for each trace. The peak-to-peak (P-P) SNR is −13 dB. For each plot of traces, the horizontal axis denotes time in milliseconds and the vertical axis denotes the offset (or index) of each trace (the offset being the source-to-receiver distance; for sensors with equal distance separation, the sensor index is equivalent to its offset), and, within each trace, the vertical axis denotes the relative amplitude of the trace. FIG. 5 shows the synthetic signal individually, apart from the noise sample. As can be seen in FIG. 4, the signal is weak relative to the noise despite the fact that the signal has a clearly defined signature without noise added, as shown in FIG. 5.

Figure 6:
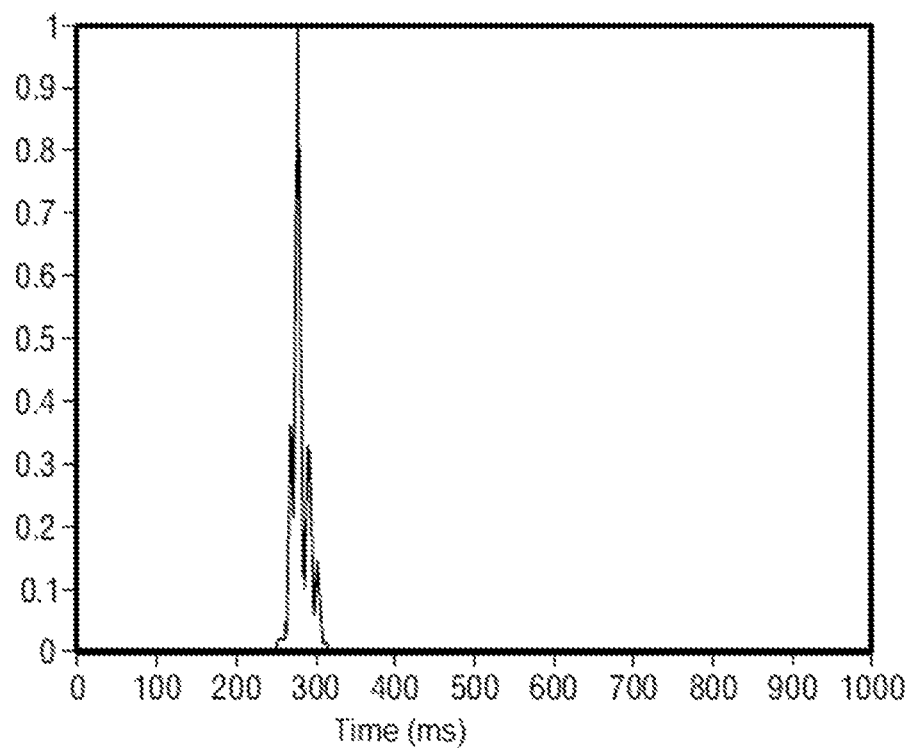
FIG. 6 shows a plot of a ratio of the short term average (STA) to the long term average (LTA), (STA/LTA), for the synthetic signal shown in FIG. 5 for reference, in accordance with an implementation of the present disclosure.

The ratio of the short term average (STA) to the long term average (LTA), referred to herein as the STA/LTA, of the signal is shown in FIG. 6 as a reference. A non-linear stacking method based on the STA/LTA is known for earthquake seismic or microseismics, and is described in more detail, see, e.g., Bungum et al., 1971, or Wong et al., 2009. The results of processing the synthetic signal with the real noise (as illustrated in FIG. 4) with the various methods available (linear stack (shown in FIG. 7), $n^{th}$ root stack (FIG. 8), phase-weighted stack (FIG. 9) and phase-weighted $n^{th}$ root stack (FIG. 10)) are shown.

Figure 7:
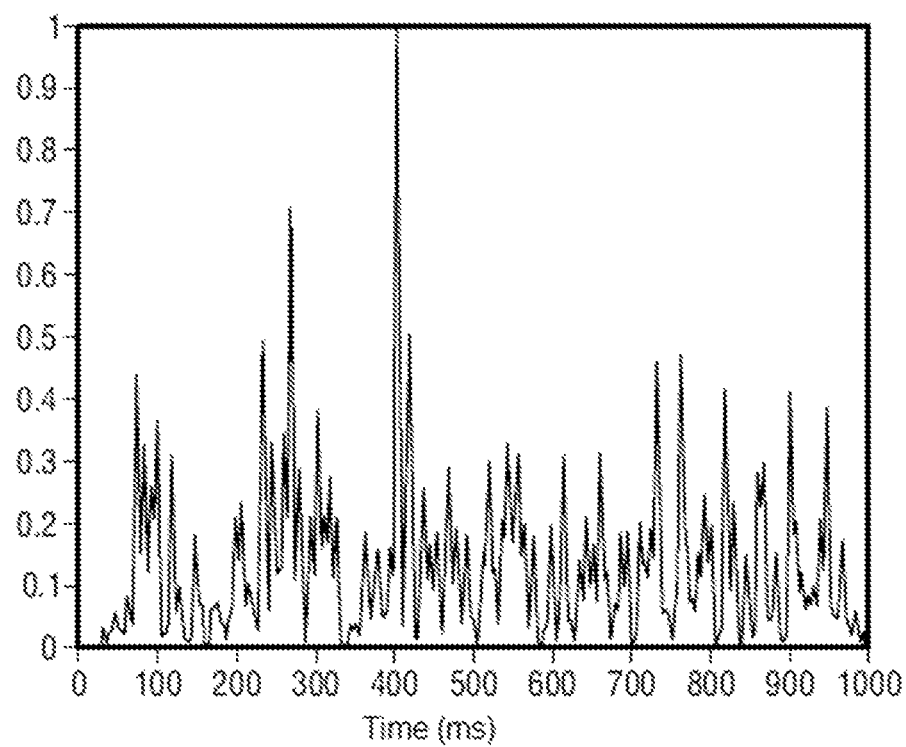
FIG. 7 shows a plot of the STA/LTA for the signal (synthetic signal added to real noise signal) shown in FIG. 4 processed according to a prior art Linear Stack method.
Figure 8:
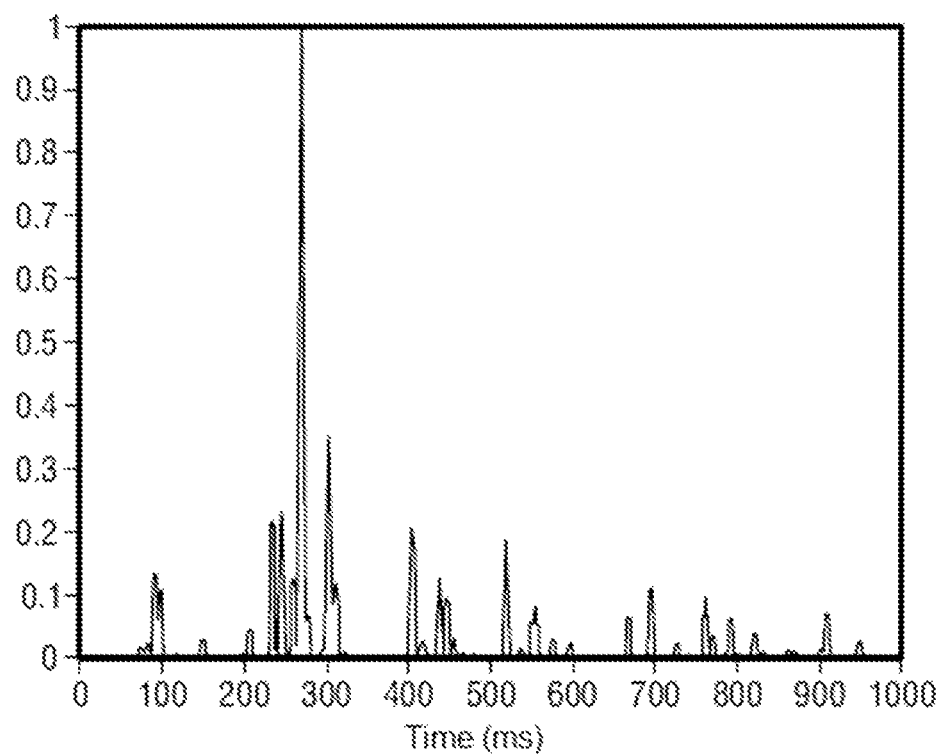
FIG. 8 shows a plot of the STA/LTA for the signal (synthetic signal added to real noise signal) shown in FIG. 4 processed according to a prior art $n^{th}$ Root Stack method.
Figure 9:
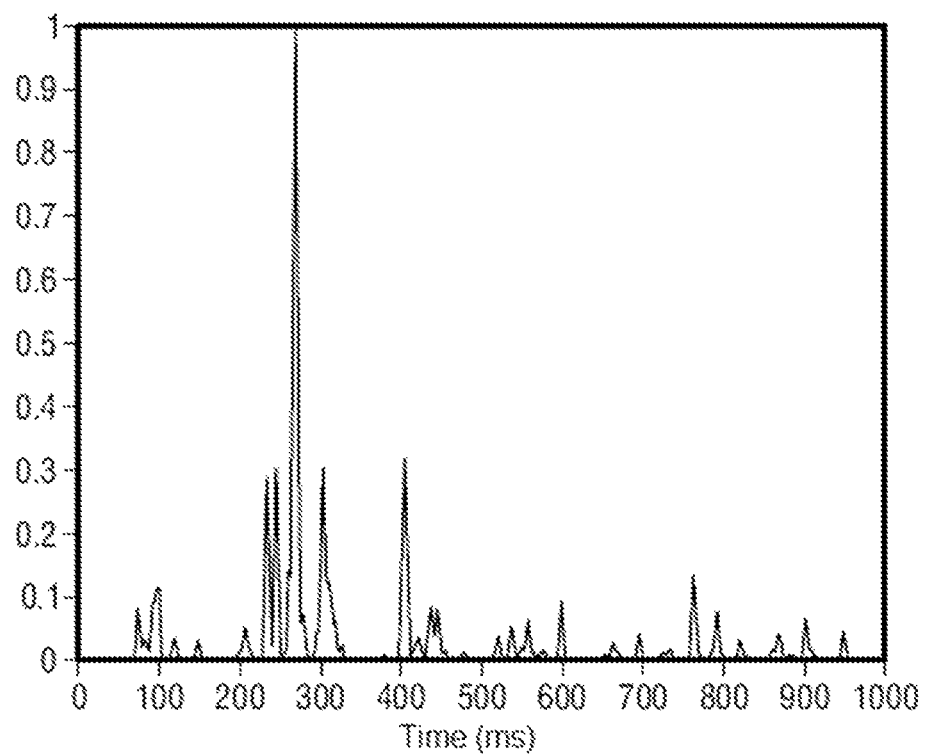
FIG. 9 shows a plot of the STA/LTA for the signal (synthetic signal added to real noise signal) shown in FIG. 4 processed according to a prior art Phase-Weighted Stack method.
Figures 10, 11:
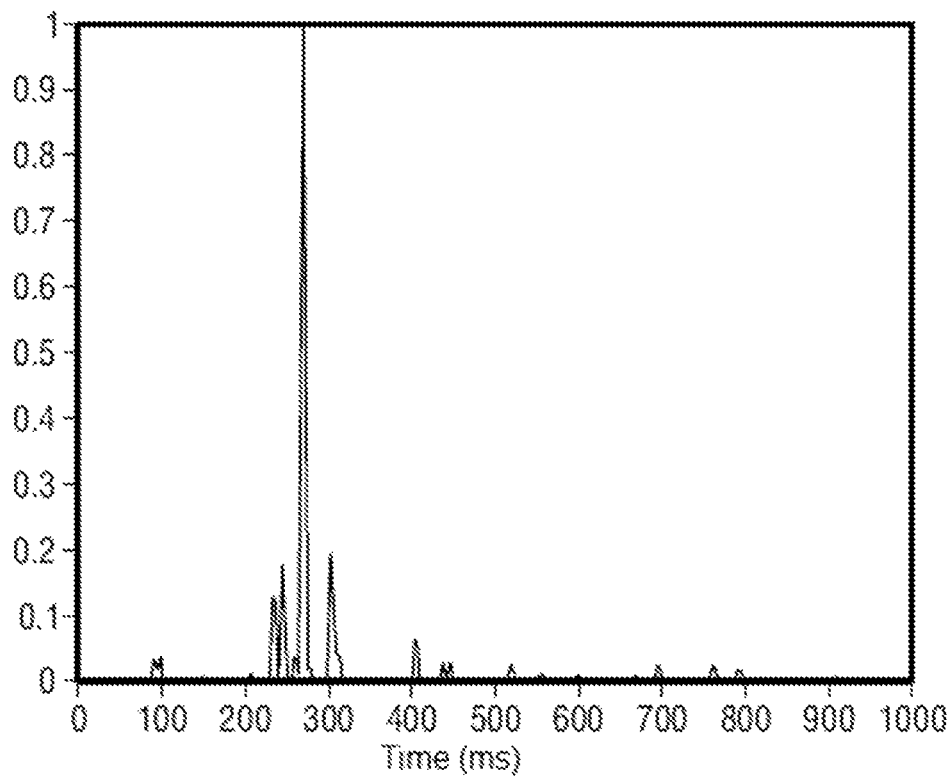
FIG. 10 shows a plot of the STA/LTA for the signal (synthetic signal added to real noise signal) shown in FIG. 4 processed according to the Phase-Weighted N-th Root Stack method, in accordance with an implementation of the present disclosure.
FIG. 11 shows a table of Detection Statistics for results of data processing methods of the present disclosure.

FIG. 7 shows a plot of the amplitude of the STA/LTA for the signal over time in milliseconds (synthetic signal added to real noise signal) shown in FIG. 4, processed according to a prior art Linear Stack method. FIG. 8 shows a plot of the amplitude of the STA/LTA for the signal over time in milliseconds (synthetic signal added to real noise signal) shown in FIG. 4, processed according to a prior art $n^{th}$ Root Stack method. FIG. 9 shows a plot of the amplitude of the STA/LTA for the signal (synthetic signal added to real noise signal) shown in FIG. 4, processed according to a prior art Phase-Weighted Stack method. FIG. 10 shows a plot of the amplitude of the STA/LTA for the signal (synthetic signal added to real noise signal) shown in FIG. 4 processed according to the Phase-Weighted $n^{th}$ Root Stack method of the present disclosure.

The linear stack method processes seismic, or microseismic, data according to an equation of the form:

$$y_{Lin}(t) = \frac{1}{L}\sum_{i=1}^{L} x_i(t) \qquad \text{eq. 10}$$

wherein Lin is the number of folds in the linear stack.

As shown in FIG. 7, the arrival time of the signal is indicated erroneously by the STA/LTA of the linear stack result with the arrival peak at about 400, while the nonlinear processes shown in FIGS. 8, 9, and 10 result in a correct arrival time for the signal of FIGS. 4 and 5 with the arrival peak at about 275. However, the result of the phase-weighted $n^{th}$ root stack has the lowest peak-to-sidelobe ratio of all of the available methods, seen in FIG. 10. The peak-to-sidelobe ratio is an indicator of the detection quality and robustness.

FIG. 11 shows a table of Detection Statistics for results of data processing methods of the present disclosure. In order to statistically compare the methods, a series of experiments were conducted using randomly varied arrival times of the seismic data signals. The results are displayed in FIG. 11. A detection may be deemed to have occurred when the peak of the STA/LTA is within 30 milliseconds of the peak of the STA/LTA of the reference signal. In terms of both the detection percentage and the average STA/LTA peak-to-sidelobe ratio, the phase-weighted $n^{th}$ root stack out-performs the other methods.

Figure 12:
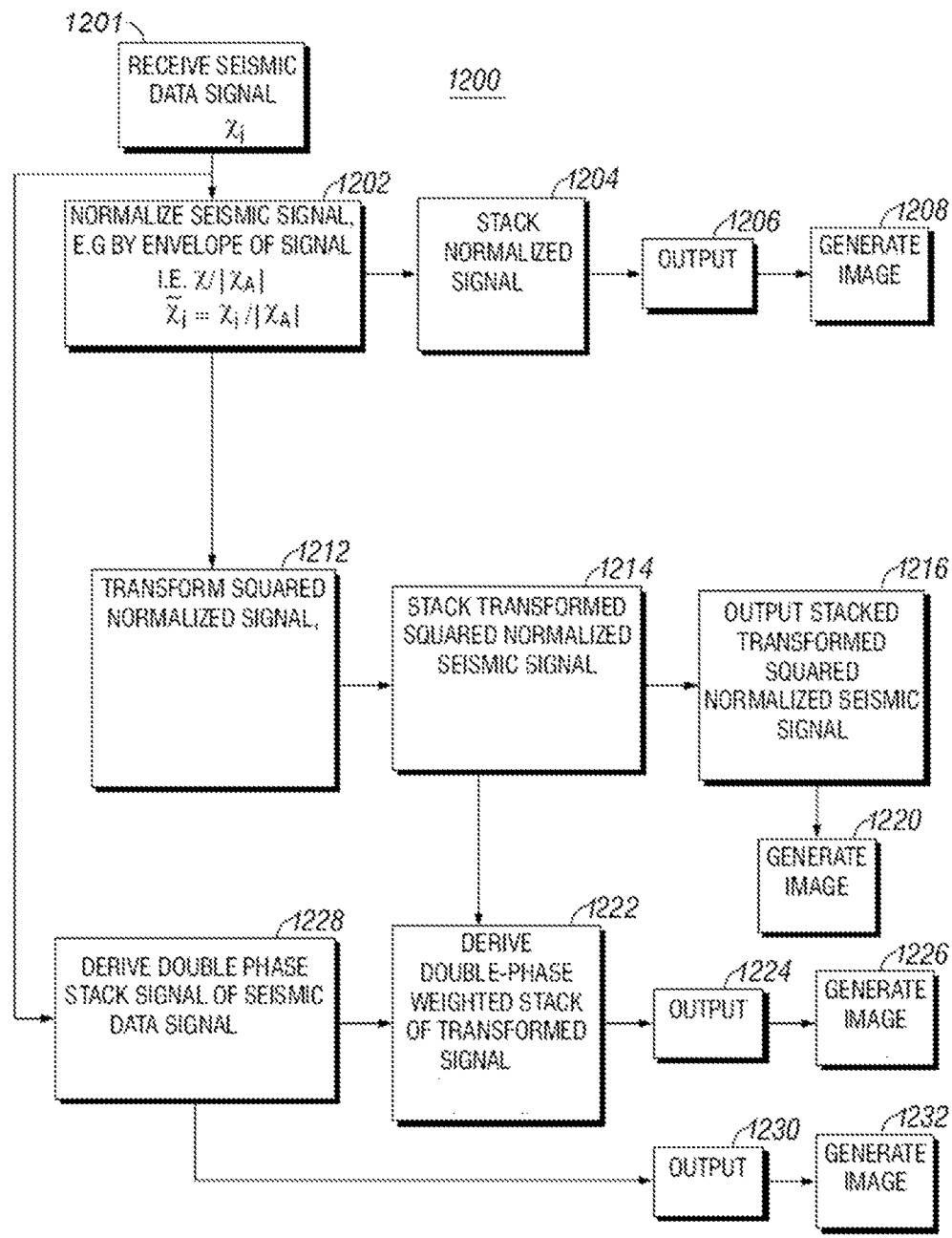
FIG. 12 shows a first seismic data processing method work flow, in accordance with one or more implementations of various techniques described herein.

In addition, FIG. 12 illustrates a flow chart for various non-linear stacking techniques 1200. The method begins with receiving the seismic data signals on a plurality of receivers or channels at 1201. In one embodiment, the method proceeds with normalizing each seismic data signal at 1202 by dividing the seismic data signal by an envelope function.

The normalized data may be referred as a real-phasor (RP) $x_{RP}(t)$. The real-phasor (RP) and the envelope function $|x_A(t)|$, in this context, can be derived from an analytic signal $x_A(t)$, defined as in eq. 5, or:

$$x_{RP}(t) = \frac{x(t)}{|x_A(t)|} \qquad \text{eq. 11a}$$

$$x_{RP}(t) = \frac{x(t)}{|x_A(t)|} = \cos(\phi_x(t)) \qquad \text{eq. 11b}$$

where $x_A(t)$ and $\phi_x(t)$ are defined in eq. 5. Eq. 11a is a definition of real-phasor, while Eq. 11b shows an identity or an alternative definition, which is defined by a phase function only. Depending on the data availability, the real-phasor may be computed by eq. 11a or 11b.

Optionally, the method proceeds with stacking at 1204 according to eq. 12, a real-phasor stack, or it proceeds at 1212 according to eq. 14, a squared real-phasor stack. Mathematically, the stacked function may be described by:

$$y_{RP}(t) = \frac{1}{L}\sum_{i=1}^{L} x_{RP,i}(t) \qquad \text{eq. 12}$$

$$y_{SRP}(t) = \frac{1}{L}\sum_{i=1}^{L} \left[ x_{RP,i}^2(t) - \frac{1}{2} \right] \qquad \text{eq. 13}$$

where subscript i denotes the different receiver signals in the data and $x_{RP}(t)$ represents the real-phasor, the normalized signal in the manner described above; $y_{RP}(t)$ is a real-phasor stack and $y_{SRP}(t)$ is a squared real-phasor stack.

The method continues with outputting at 1206 the stacked normalized signal. Optionally, the method can include generating at 1208 an image of the formation based on the stacked normalized signal.

In an alternative embodiment also shown in FIG. 12, the method may proceed to 1212, squared real-phasor. Squaring the real-phasor makes any two signals of opposing polarity identical.

The optional stacking step 1214 results in resistance to polarity reversals. The method continues with outputting at 1216 the stacked transformed signal. Optionally, the method can include generating at 1220 an image of the formation based on the stacked transformed signal.

In yet another alternative embodiment also shown in FIG. 12, the method may include additional steps applied to the stacked transformed signal at 1214. Specifically, from the stacked transformed signal at 1214, the method can proceed with calculating at 1222 a double-phase-weighted stack of the transformed signal. Mathematically, the double phase-weighted stack of the transformed signal can be represented by a function of the form:

$$y_{DPWSRP}(t,m) = [y_{DP}(t)]^m y_{SRP}(t) \qquad \text{eq. 14}$$

where $y_{DPWSRP}(t, m)$, $y_{DP}(t)$, and $y_{SRP}(t)$ are defined above. The double-phase-weighted stack $y_{DP}(t)$ of the transformed signal can be output at 1224, and from the output, an image can be generated at 1226.

Figure 13A:
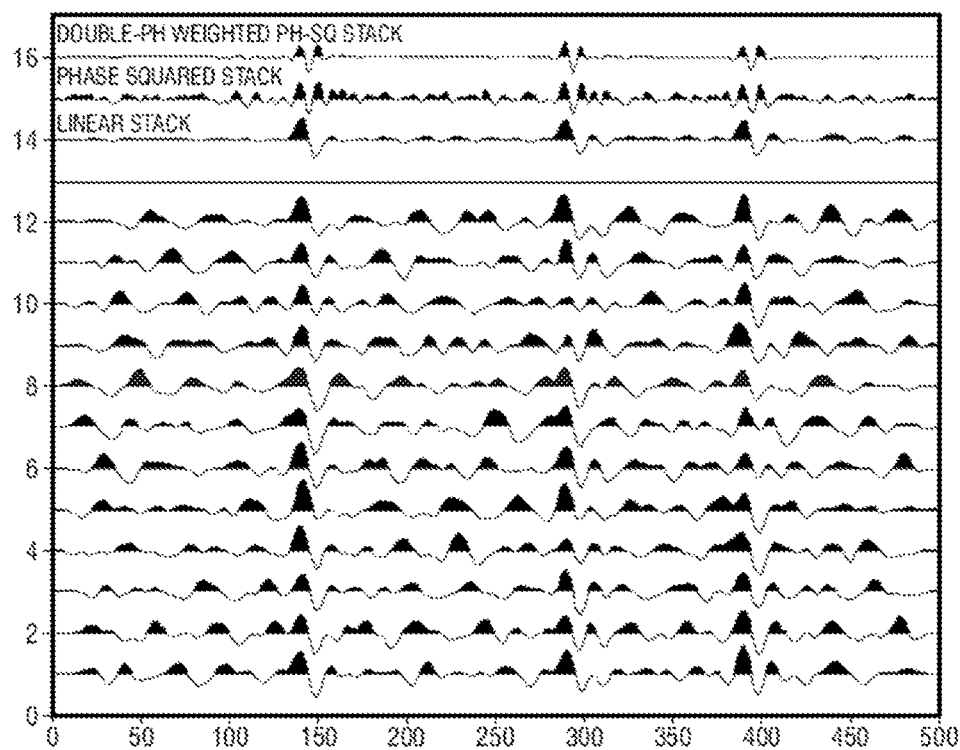
FIG. 13A shows example seismic data traces, before and after stacking according to a method shown in FIG. 12, where the signal has a consistent polarity.

In still another alternative embodiment shown in FIG. 12, from the received seismic data signal, the method can proceed to calculating a double phase stack signal at 1228 of the same form shown in eq. 6. From the double phase stack signal, the method may proceed in one of two ways. It can proceed by calculating at 1222 the double-phase-weighted stack of the transformed signal, outputting at 1224, and optionally generating an image at 1226. Alternatively, the method may proceed from 1228 to directly outputting at 1230 the double phase stacked signal of eq. 6 and generating an image at 1232 therefrom. Any one of the non-linear weighting factors discussed above may be used with a linear stack to form a non-linear stacking FIG. 13A illustrates an example showing a plot of 16 seismic traces, each containing 500 samples at regular time intervals. The sample values are displayed as wiggle-traces, with positive values shown as solid black wiggle. The horizontal axis shows the time-index position. Traces 1-12 contain real noise data with a consistent signal waveform added at approximate time-indexes 140, 290, and 380. The added signal has the same polarity on the 12 traces. Trace 14 shows a linear stack (such as that obtained by a function of the form of eq. 10) of traces 1-12, and shows how stacking can reduce the incoherent noise in the resultant "stacked" trace. Trace 15 shows a phase-squared stack (such as that obtained by a function of the form of eq. 8) of traces 1-12. Trace 16 shows a double-phase-weighted phase-squared stack (such as that obtained by a function of the form of eq. 14) of traces 1-12. These non-linear stacking methods can modify the signal shape and may not reduce coherent noise as effectively as the normal (linear) stack when the input signal is strong compared to the noise.

This example illustrates the sensitivity to signal polarity, and the effectiveness of various non-linear stacking methods for the case of a weak signal compared to the input noise.

Figure 13B:
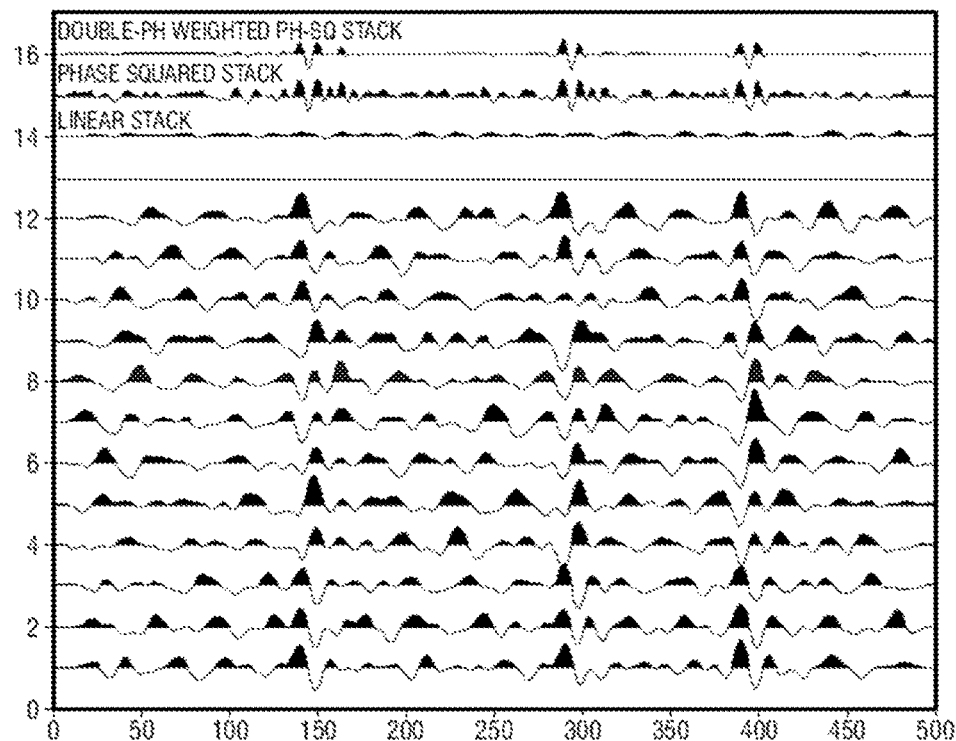
FIG. 13B shows example seismic data traces similar to FIG. 13A, but the signal polarity is reversed for half of the traces.

FIG. 13B further illustrates the same noise traces as in FIG. 13A, but the signals on 6 traces have sample values that are of opposite polarity compared to the first signal. That is, the signal amplitudes on 6 of the 12 traces are multiplied by −1; this can be seen on the lower 12 traces where the large black signal wiggles are aligned with large white signal wiggles on traces 4-9. Trace 14 shows a new stack of traces 1-12 with half of the signal having the opposite polarity, which causes the total signal to become cancelled in the stacking process. Trace 15 is a new phase-normalised stack of traces 1-12 and the phase normalised result is equivalent to the result in FIG. 13A above. Trace 16 shows a double-phase-weighted phase-normalised stack, also an equivalent to the result in FIG. 13A, above. Comparison of traces 14-16 in FIG. 13A and FIG. 13B illustrates that the prior art linear or non-linear stacking processes can be sensitive to the polarity of the input signals whilst the phase-normalised stack and the double-phase-weighted phase-normalised stacks are resilient to changes in the polarity of the input signals.

The examples are not intended to be limiting of the claims presented herein. The embodiments illustrated in FIGS. 13A and 13B show extreme cases where half of the input signals have the opposite polarity to emphasize the differences in the results. It is recognized that for cases where the number of signals with reversed polarity is not exactly half then the signal may not be exactly cancelled in the prior art linear or non-linear stack. The new stacking methods presented herein, however, provide the same output signal magnitude regardless of how many signals are reversed.

Additionally, the examples illustrated by FIGS. 13A and 13B show a simplified case where the input model signals have identical amplitude to emphasize the differences in the results. It is recognised that for cases where the signal amplitudes are not exactly the same on all input traces then the signal may not be exactly cancelled in the normal stack. The new stacking methods presented herein provide the same output signal magnitude with and without polarity changes regardless of any variation in signal amplitudes on the input traces.

Figure 14:
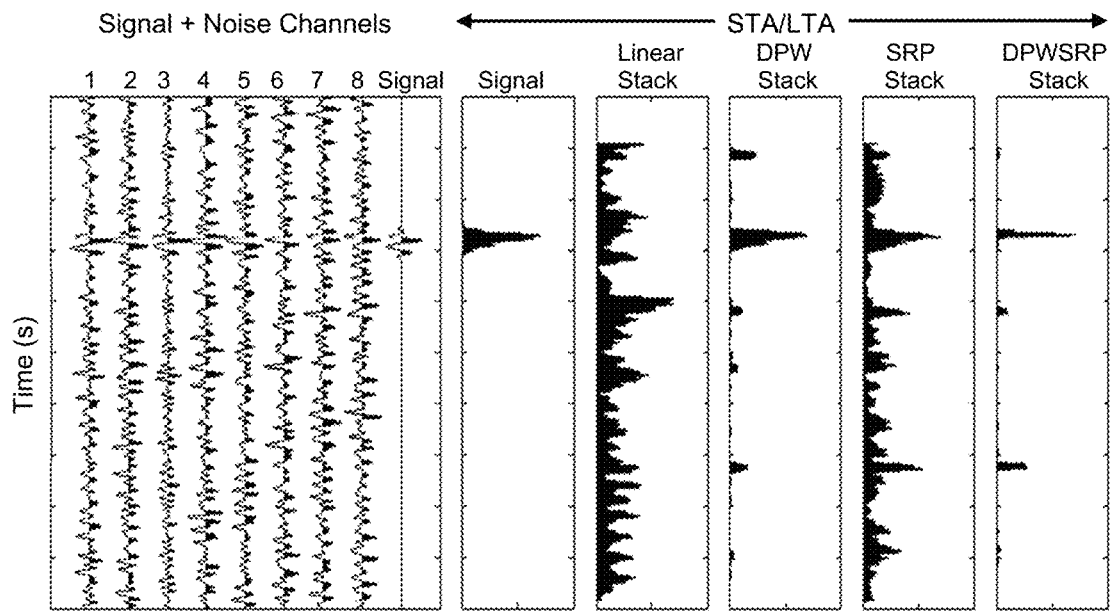
FIG. 14 shows example seismic data traces similar to FIG. 13B, using several different non-linear stacking methods.

FIG. 14 illustrates another example data processing result using several different non-linear stacking. The signal on 4 traces is now of reversed polarity with a SNR of 0 dB. The linear stack has no signal response while the nonlinear stacks show good detection. The left panel shows eight (8) noise traces with added signal, reversed polarity on traces 2,4,5,6 and a SNR of 0 dB. The right panels show STA/LTA detection function applied to the signal, the linear stack, the double-phase-weighted stack, the squared-real-phasor stack and the double-phase-weighted squared-real-phasor stack. For this case, the double-phase-weighted squared-real-phasor stack provides the best SNR improvement. The linear stack yields no real signal and produces many false signals.

Figure 15:
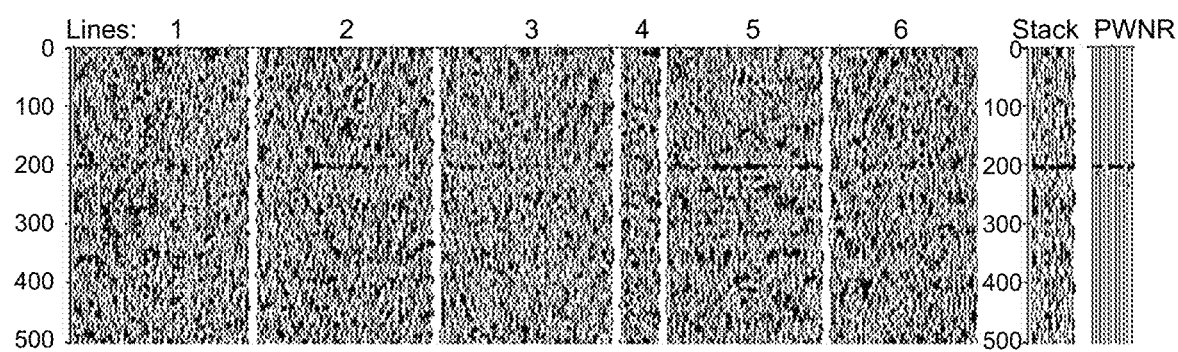
FIG. 15 illustrates an example of using non-linear stacking to improve Signal-to-Noise-Ratio (SNR) according to one embodiment.

FIG. 15 illustrates an application of a non-linear stacking method for weak signals using microseismic data and applications from a surface monitoring experiment using a Coalescence Microseismic Mapping (CMM) method according to Drew et al. (2005). The raw surface data has SNR<<1; signal detection and discrimination (using STA/LTA), calibrated velocity model building and the subsequent scanning and accurate location inversion would be much less reliable if applied directly to the raw data. FIG. 15 (left) shows a P-wave arrival from a perforation shot after pre-processing on six surface receiver lines. Pre-processing includes random noise attenuation, mild bandpass filtering, automatic gain control, and model based travel-time correction to align the signal at 200 ms; it excludes coherent noise removal. FIG. 15 (right) shows two panels of partial stacks with the same input, comparing the linear stacking and nonlinear PWNR output. These traces represent the spatial distribution of the surface signal that is input to the detection and scanning process. The PWNR stack provides higher SNR and better noise discrimination than the linear stack. The fold in each panel is the same but varies spatially from 150-250 due to receiver line geometry. The nonlinear process has an average SNR>30, compared to SNR<3 for the linear stack.

Figure 16:
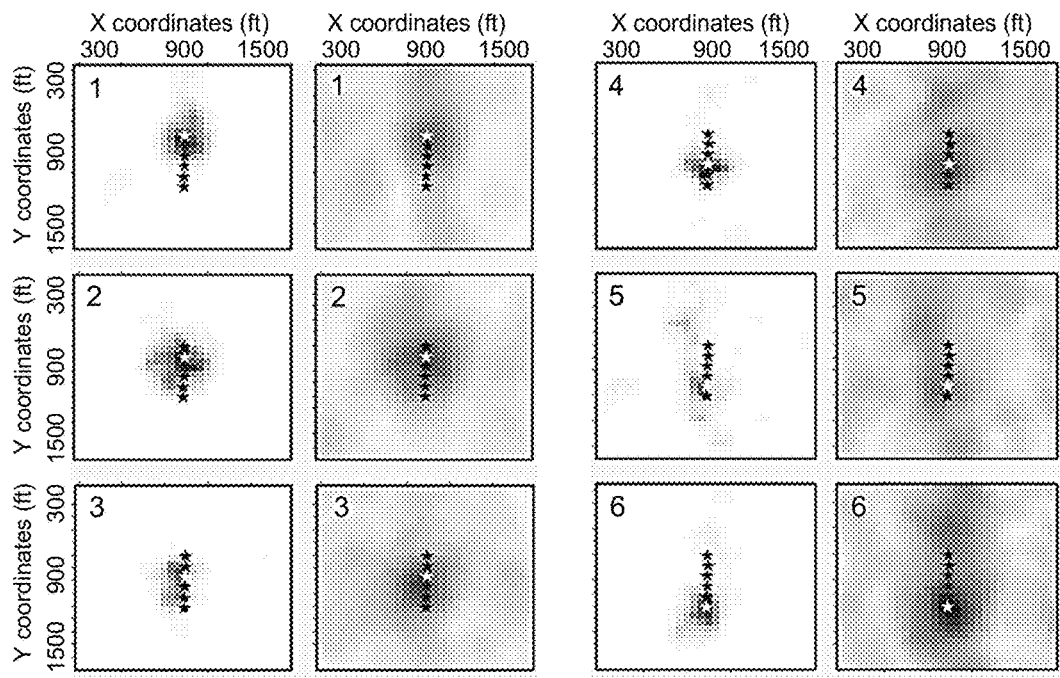
FIG. 16 illustrates another example of detecting microseismic events (perforation shots) according to one embodiment.

FIG. 16 shows another example; it is a series of pairs of XY scan-slices through the respective peak times for six perforation shots at 20 m intervals along a well path. Each pair of plots shows the linear (the right panel) and nonlinear PWNR (the left panel) result. Each white star in each panel indicates a firing location. The linear stack peak (on the right for each pair) is reasonable for these known sources but the high background noise level means that signal discrimination would be clearly compromised when searching for other weak sources. The nonlinear result (on the left) has higher SNR and noise discrimination. The image from the nonlinear stack is closely correlated to the firing locations.

Figure 17:
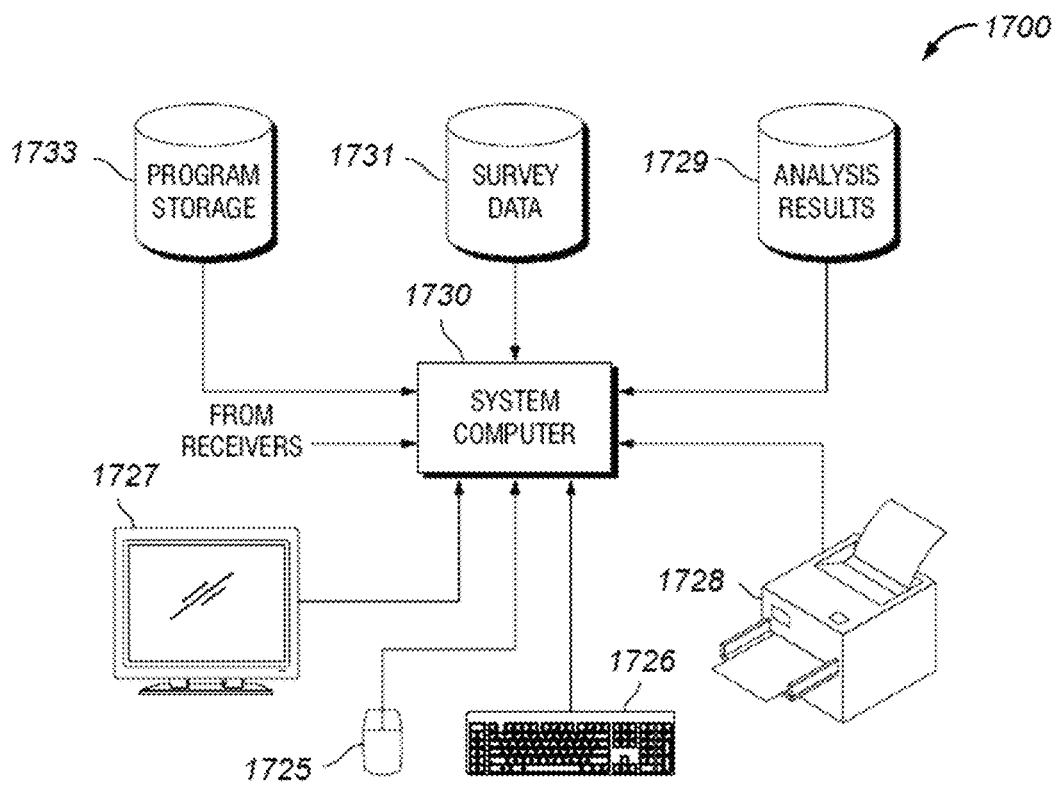
FIG. 17 illustrates a computer network, into which implementations of various technologies described herein may be implemented.

FIG. 17 illustrates a computing system 1700, into which implementations of various technologies described herein may be implemented. The computing system 1700 may include one or more system computers 1730, which may be implemented as any conventional personal computer or server. However, those skilled in the art will appreciate that implementations of various technologies described herein may be practiced in other computer system configurations, including hypertext transfer protocol (HTTP) servers, hand-held devices, multiprocessor systems, microprocessor-based or programmable consumer electronics, network PCs, mini-computers, mainframe computers, and the like.

The system computer 1730 may be in communication with disk storage devices 1729, 1731, and 1733, which may be external hard disk storage devices. It is contemplated that disk storage devices 1729, 1731, and 1733 are conventional hard disk drives, and as such, will be implemented by way of a local area network or by remote access. Of course, while disk storage devices 1729, 1731, and 1733 are illustrated as separate devices, a single disk storage device may be used to store any and all of the program instructions, measurement data, and results as desired.

In one implementation, seismic data from the receivers may be stored in disk storage device 1731. The system computer 1730 may retrieve the appropriate data from the disk storage device 1731 to process seismic data according to program instructions that correspond to implementations of various technologies described herein. The program instructions may be written in a computer programming language, such as C++, Java and the like. The program instructions may be stored in a computer-readable medium, such as program disk storage device 1733. Such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the system computer 1730.

Communication media may embody computer-readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of any of the above may also be included within the scope of computer readable media.

In one implementation, the system computer 1730 may present output primarily onto graphics display 1727, or alternatively via printer 1728. The system computer 1730 may store the results of the methods described above on disk storage 1729, for later use and further analysis. The keyboard 1726 and the pointing device (e.g., a mouse, trackball, or the like) 1725 may be provided with the system computer 1730 to enable interactive operation.

The system computer 1730 may be located at a data center remote from the survey region. The system computer 1730 may be in communication with the receivers (either directly or via a recording unit, not shown), to receive signals indicative of the reflected seismic energy. These signals, after conventional formatting and other initial processing, may be stored by the system computer 1730 as digital data in the disk storage 1731 for subsequent retrieval and processing in the manner described above. While FIG. 17 illustrates the disk storage 1731 as directly connected to the system computer 1730, it is also contemplated that the disk storage device 1731 may be accessible through a local area network or by remote access. Furthermore, while disk storage devices 1729, 1731 are illustrated as separate devices for storing input seismic data and analysis results, the disk storage devices 1729, 1731 may be implemented within a single disk drive (either together with or separately from program disk storage device 1733), or in any other conventional manner as will be fully understood by one of skill in the art having reference to this specification.

Note that while the present disclosure describes the concepts as applied to a time domain representation of the signal, it is intended that the same principals apply if treating the signal in other forms including complex wavelets. Complex wavelets are a more general way to describe the signal, and encompasses both the complex time domain representation (wavelet is a "delta function" in time domain), frequency domain representation (wavelet is a "sine wave" in time domain) and other classes of "wavelets" that to a greater or lesser degree are compact in the time domain or frequency domain. In all cases the concept of the complex "wavelet" representation of the signal includes the concept of amplitude and phase.

Additionally, the methods and systems of the present disclosure may be fully automated and able to operate continuously in time for monitoring, detecting, and locating seismic and microseismic events from on or multiple seismic detectors. Methods of the present invention utilize the contributions from one or multiple seismic detectors.

While the disclosure has been disclosed with respect to a limited number of embodiments, those skilled in the art, having the benefit of this disclosure, will appreciate numerous modifications and variations therefrom. While the disclosure has been described in the context of applications in downhole tools, the apparatus of the disclosure can be used in many applications.

Although a few example embodiments have been described in detail above, those skilled in the art will readily appreciate that many modifications are possible in the example embodiments without materially departing from this disclosure. Accordingly, all such modifications are intended to be included within the scope of this disclosure as defined in the following claims. In the claims, means-plus-function clauses are intended to cover the structures described herein as performing the recited function and not simply structural equivalents, but also equivalent structures. Thus, although a nail and a screw may not be structural equivalents in that a nail employs a cylindrical surface to secure wooden parts together whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

The preferred aspects and embodiments were chosen and described in order to best explain the principles of the invention and its practical application. The preceding description is intended to enable others skilled in the art to best utilize the invention in various aspects and embodiments and with various modifications as are suited to the particular use contemplated. The description may be implemented in any seismic or microseismic measurement system, and particularly for microseismic for hydraulic fracture monitoring. In addition, the methods may be programmed and saved as a set of instructions, that, when executed, perform the methods described herein. It is intended that the scope of the invention be defined by the following claims.

What is claimed is:

1. A computer program product stored in one or more non-transitory computer readable mediums for performing a method for use in well production or treatment, the method comprising:
   receiving via a sensor a seismic data signal acquired in a formation, the seismic data signal including a microseismic data signal;
   computing a non-linear stack of the seismic data signal having a non-linear weighting factor;
   outputting the non-linear stack;
   using the output non-linear stack to identify a microseismic event in time and space in an oilfield operation comprising one or more of hydraulic fracturing, fluid production, water flooding, steam flooding, gas flooding, or formation compaction, and
   displaying an image of the formation based on the non-linear stack;
   wherein the non-linear weighting factor is selected from a first group of a double phase, a double phase-weighted, a real phasor, and a squared real phasor.

2. The computer program product of claim 1, wherein the non-linear weighting factor is a product of two factors selected from a second group including a phase, an $n^{th}$ root, the double phase, the real phasor, and the squared real phasor.

3. The computer program product of claim 2, wherein the non-linear weighting factor is a product of more than two non-linear weighting factors from the second group.

4. The computer program product of claim 2, wherein the non-linear weighting factor is a product of the double phase, squared real phasor, and $n^{th}$ root.

5. The computer program product of claim 2, wherein the non-linear stack of the seismic data signal comprises a linear summation of the seismic data signal weighted by an instantaneous phase of the seismic data signal.

6. The computer program product of claim 5, wherein the non-linear stack of the seismic data signal is calculated according to an equation of the form:

$$y_P(t) = \frac{1}{L}\left|\sum_{i=1}^{L} \exp\{j_{x,i}(t)\}\right|,$$

where $y_P(t)$ is the non-linear stack of the seismic data signal, L is a number of traces, i denotes different receiver signals, j is $\sqrt{1}$, and $_{x,i}(t)$ is an instantaneous phase.

7. The computer program product of claim 2, wherein an $n^{th}$ root stack of the seismic data signal comprises a nonlinear summation of the seismic data signal weighted by the $n^{th}$ root of the seismic data signal.

8. The computer program product of claim 7, wherein the $n^{th}$ root stack of the seismic data signal is calculated according to an equation of the form:

$$y_{NR}(t,n) = \text{sgn}[u(t,n)]|u(t,n)|^n,$$

where u(t,n) is the $n^{th}$ root stack, sgn[u(t, n)] is a sign or signum function, and $y_{NR}(t,n)$ is a product of sgn[u(t, n)] and u(t,n).

9. The computer program product of claim 2, wherein computing the non-linear stack of the seismic data signal comprises computing a double-phase-weighted stack of the seismic data signal.

10. A computer program product stored in one or more non-transitory computer readable mediums for performing a method for use in well production or treatment, the method comprising:
   receiving via a sensor a seismic data signal acquired in a formation, the seismic data signal including a microseismic data signal;
   computing a phase-weighted $n^{th}$ root stack of the seismic data signal according to the form: $y_{PWNR}(t, m, n) = [y_P(t)]^m y_{NR}(t, n)$, where $y_{PWNR}(t,m,n)$ is the phase-weighted $n^{th}$ root stack, $y_P(t)$ is a non-linear stack of the seismic data signal, m is a user selected parameter, and $y_{NR}(t,n)$ is a product of the nth root stack and a sign or signum function,
   outputting the non-linear stack;
   using the output non-linear stack to identify a microseismic event in time and space in an oilfield operation comprising one or more of hydraulic fracturing, fluid production, water flooding, steam flooding, gas flooding, or formation compaction, and
   displaying an image of the formation based on the non-linear stack.

11. The computer program product of claim 10, wherein computing the phase-weighted $n^{th}$ root stack of the seismic data signal further comprises computing a double phase-weighted $n^{th}$ root stack of the seismic data signal.

12. The computer program product of claim 11, wherein the double phase-weighted $n^{th}$ root stack comprises a product of a double phase-weighted stack of the seismic data signal and an $n^{th}$ root stack of the seismic data signal.

13. The computer program product of claim 10,
wherein a phase stack factor of the phase-weighted $n^{th}$ root stack is calculated according to an equation of the form:

$$y_P(t) = \frac{1}{L}\left|\sum_{i=1}^{L} \exp\{j x_{,i}(t)\}\right|;$$

and
wherein an $n^{th}$ root stack factor of the phase-weighted $n^{th}$ root stack is calculated according to an equation of the form:

$$y_{NR}(t,n) = \text{sgn}[u(t,n)]|u(t,n)|^n,$$

where L is a number of traces, i denotes different receiver signals, j is x,(t) is an instantaneous phase, sgn[u(t, n)] is the sign or signum function.

14. A system for acquiring seismic data and processing seismic data, the system comprising:
a seismic acquisition apparatus disposed at a formation that acquires the seismic data via a receiver; and
a data processing apparatus configured to:
receive via a sensor a seismic data signal acquired in the formation, the seismic data signal including a microseismic data signal;
compute a phase stack of the seismic data signal;
compute an $n^{th}$ root stack of the seismic data signal;
compute a phase-weighted $n^{th}$ root stack, wherein the phase-weighted $n^{th}$ root stack comprises the products of factors selected from the phase stack and the $n^{th}$ root stack;
output the phase-weighted $n^{th}$ root stack; and
use the output phase-weighted $n^{th}$ root stack to identify a microseismic event in time and space in an oilfield operation comprising one or more of hydraulic fracturing, fluid production, water flooding, steam flooding, gas flooding, or formation compaction; and
a display apparatus configured to display an image of the formation based on the phase-weighted $n^{th}$ root stack.

15. A system for acquiring seismic data and processing seismic data, the system comprising:
a seismic acquisition apparatus that acquires the seismic data; and
a data processing apparatus configured to:
receive a seismic data signal acquired in an Earth formation;
compute a phase stack of the seismic data signal;
compute an $n^{th}$ root stack of the seismic data signal;
compute a phase-weighted $n^{th}$ root stack, wherein the phase-weighted $n^{th}$ root stack is a product of the phase stack and the $n^{th}$ root stack; and
using one or more of the computed phase stack, $n^{th}$ root stack, or phase-weighted $n^{th}$ root stack to identify a microseismic event in time and space in an oilfield operation comprising one or more of hydraulic fracturing, fluid production, water flooding, steam flooding, gas flooding, or formation compaction.

* * * * *